United States Patent [19]

Mori et al.

[11] Patent Number: 5,069,838
[45] Date of Patent: Dec. 3, 1991

[54] METHOD OF PRODUCING FRAME-INSTALLED SEAT PAD STRUCTURE

[75] Inventors: Masami Mori; Norio Yanagishita; Ichiro Matsuura; Kiichiro Ishimaru; Hisayoshi Mizuno, all of Kanagawa, Japan

[73] Assignee: Ikeda Bussan Co., Ltd., Ayase, Japan

[21] Appl. No.: 501,965

[22] Filed: Mar. 28, 1990

Related U.S. Application Data

[63] Continuation of Ser. No. 277,868, Nov. 30, 1988, abandoned.

[30] Foreign Application Priority Data

Mar. 30, 1988 [JP] Japan .................................. 63-74643

[51] Int. Cl.$^5$ .............................................. B29C 67/22
[52] U.S. Cl. .................................. 264/46.6; 264/46.7; 264/271.1; 264/278
[58] Field of Search ................... 264/46.4, 46.6, 46.7, 264/278, 271.1

[56] References Cited

U.S. PATENT DOCUMENTS 3,520,008  7/1970  Frieder et al. ............................. 9/14
4,240,999  12/1980  Decker, Jr. ........................... 264/46.5

FOREIGN PATENT DOCUMENTS 181604  5/1986  European Pat. Off. .
2107392  5/1972  France .
2171886  9/1973  France .

Primary Examiner—Frank Spear
Assistant Examiner—Allan R. Kuhns
Attorney, Agent, or Firm—Foley & Lardner

[57] ABSTRACT

A method of producing a frame-installed seat pad structure, which includes by steps (a) preparing a mold assembly which includes a mold and a lid, the lid having a foamable material feeding tube connected thereto; (b) preparing an endless elongate member which defines therein and therealong a continuous way, the endless elongate member having an inlet portion matable with the feeding tube of the lid and a plulality of outlet portions; (c) detachably connecting the endless elongate member to the lid having the inlet portion thereof mated with material feeding tube; (d) putting the lid on the mold having the endless elongate member exposed to a cavity of the mold; (e) pouring a foamable plastic material into the material feeding tube, so that the material flows in and along the continuous way and falls into the cavity through the outlet portions; (f) curing the material; and (g) removing the lid from the mold when the material is hardened to a certain degree.

9 Claims, 1 Drawing Sheet

METHOD OF PRODUCING FRAME-INSTALLED SEAT PAD STRUCTURE

This application is a continuation of application Ser. No. 07/277,868, filed Nov. 30, 1988, now abandoned.

BACKGROUND OF THE INVENTION

1. Field of the Invention

The present invention relates in general to a method of producing a seat pad structure, and more particularly, to a method of producing a frame-installed seat pad structure which generally comprises a rectangularly extending frame, springs extending between opposed portions of the frame and a foamed plastic cushion pad mounted on the frame and the springs. More specifically, the present invention is concerned with a method of distributing a foamable plastic material evenly throughout a cavity of a mold.

2. Description of the Prior Art

Hitherto, a so-called "monobloc molding method" has been widely used particularly in the field of seat cushion manufacturing.

That is, in order to produce a frame-installed seat pad structure, the method carries out a process which comprises putting a frame in a cavity of a mold, putting a lid on the mold to close the cavity, fastening the lid to the mold, pouring a foamable plastic material into the cavity through an inlet opening formed in the lid, and curing the material under a given condition.

However, this method has the following drawback due to its inherency.

That is, during pouring of the material into the mold through the single inlet opening of the lid, it tends to occur that the material gathers at a certain position near the inlet opening and foaming starts from the material lump at the position and advances outwardly therefrom. This phenomenon however causes not only formation of undesired air-pockets in the foamed product but also undesired underfill at the peripheral portion of the product.

SUMMARY OF THE INVENTION

It is therefore an object of the present invention to provide a method of producing a frame-installed seat cushion pad, which method is free of the above-mentioned drawbacks.

According to the present invention, there is provided a method of producing a frame-installed seat pad structure, in which method an element (viz., a seat frame) of the seat cushion pad structure is used as a part of a material distributing device.

According to the present invention, there is provided a method of producing a frame-installed seat pad structure, which comprises by steps (a) preparing a mold assembly which comprises a mold and a lid, the lid having a foamable material feeding tube connected thereto; (b) preparing an endless elongate member which defines therein and therealong a continuous way, the endless elongate member having an inlet portion matable with the feeding tube of the lid and a plurality of outlet portions; (c) detachably connecting the endless elongate member to the lid having the inlet portion mated with the material feeding tube; (d) putting the lid on the mold having the endless elongate member exposed to a cavity of the mold; (e) pouring a foamable plastic material into the material feeding tube, so that the material flows in and along the continuous way and falls into the cavity through the outlet portions; (f) curing the material; and (g) removing the lid from the mold when the material is hardened to a certain degree.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
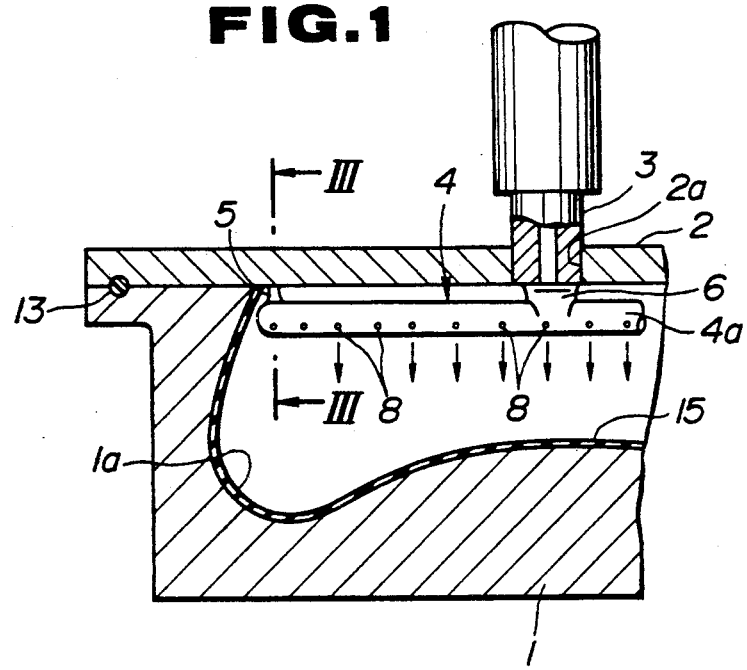
FIG. 1 is a sectional, but half, view of a mold assembly which is practically used in the method of the present invention is practically applied.

Referring to FIG. 1, there is shown a mold assembly which is used in the method according to the present invention. The mold assembly comprises a mold 1 having a cavity 1a shaped to match with the contour of a seat cushion pad to be produced, a lid 2 adapted to be put on the mold 1 to close the cavity 1a, and a seal member 13 seated on the mold 1 to achieve sealing between the mold 1 and the lid 2.

The lid 2 is formed with an opening 2a to which a foamable material pouring tube 3 is mated. As will be understood from FIGS. 1 and 3, the lid 2 is equipped at its inner side with a plurality of clips 5 for the purpose which will be clarified hereinafter.

Figure 2:
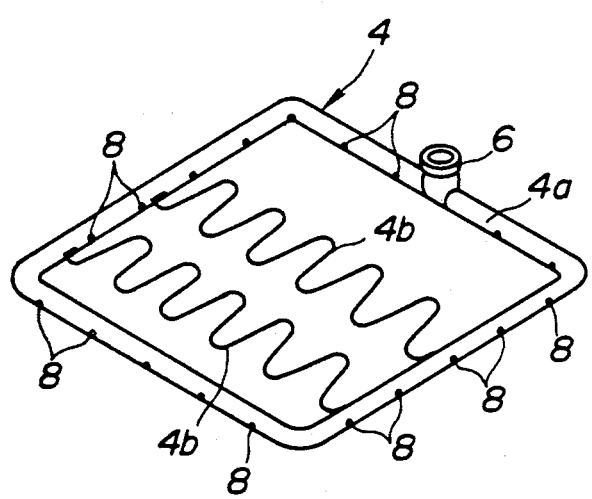
FIG. 2 is a perspective view a frame structure which is used in the method of the present invention.
Figure 3:
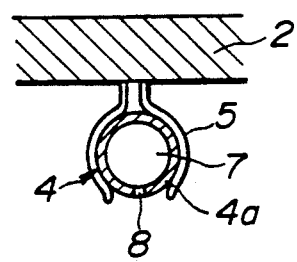
FIG. 3 is an enlarged sectional view taken along the line III—III of FIG. 1.

In the following, the steps for producing a frame-installed seat cushion pad will be described with reference to FIGS. 1 to 3.

First, a bag-shaped outer skin member 15 is put into the cavity 1a of the mold 1.

Then, a frame 4 is prepared. As is seen from FIG. 2, the frame 4 is of a rectangularly extending pipe which is formed therealong with a plurality of openings 8. To a middle part of one side of the pipe frame 4, there is fixed an inlet pipe 6 which is sized to be mated with the pouring tube 3. A plurality of spring wires 4b extend between opposed sides of the rectangular frame 4.

The frame 4 is detachably connected to the lid 2 by means of the clips 5 having the inlet pipe 6 mated with the material pouring tube 3.

Then, the lid 2 is put on the mold 1 having the frame 4 received in the cavity 1a of the mold 1, and then the lid is tightly fastened to the mold 1 by means of a known fastener (not shown).

Then, a foamable plastic material, such as a material for foamed polyurethane or the like, is poured into the tube 3. With this, as is seen from FIG. 1, the material flows in the frame pipe 4 and flows out the openings 8 filling the cavity 1a with the material.

When the amount of the material fed to the cavity 1a comes to a given degree, the material supply is stopped. Thereafter, the material in the cavity 1a is cured for a certain time in a known manner. During the curing, the material foams and enfolds the frame 4 completely. It is to be noted that the material remained within the frame 4 is also cured.

When the material is hardened to a certain level, the lid 2 is removed from the mold 1. Then, the frame 4 is disconnected from the lid 4 for releasing the product, viz., a frame-installed seat cushion pad, from the mold 1.

Figure 4:
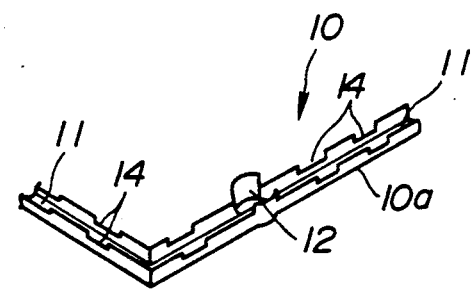
FIG. 4 is a partial view of another frame structure which is usable in the method of the present invention.

Referring to FIG. 4, there is shown another frame 10 which is also usable in the method of the present invention. The frame 10 is of a gutter member, which has an inlet portion 12 matable with the material pouring tube 3 and a plurality of outlet recesses 14. For the temporary assembly, the frame 10 is held by the clips 5 having the inlet portion 12 mated with the material pouring tube 3. Thus, during the material supply, the material flows in the gutter 11 and flows out the outlet recesses 14.

In the following, advantages of the present invention will be described.

Because of provision of the numerous outlets 8 or 14 for the material, the distribution of the material to the cavity 1a is evenly achieved throughout the entire of the same.

Upon completion of curing, the foam in the frame 4 or 10 and the foam outside of the frame becomes integrally connected through foams which are placed in the material outlet openings 8 or recesses 14 of the frame. Thus, the connection of the frame 4 or 10 to the foamed pad is assured.

Since an element (viz., the frame 4 or 10) of the seat cushion pad structure is used as a part of material feeding device, this production method can be easily carried out without increasing the number of parts of the material feeding device.

What is claimed is:

1. A method of producing a seat pad structure which has a frame installed therein, comprising the steps of:
   (a) preparing a mold assembly which comprises a mold and a lid, said lid having a foamable material feeding tube connected thereto;
   (b) forming said frame as an endless elongate member which defines therein a continuous way and having an inlet portion matable with said feeding tube of said lid and a plurality of outlet portions;
   (c) equipping said lid with a plurality of clips for detachably connecting said frame and connecting said frame to said lid by said clips having said inlet portion of said frame mated with said material feeding tube;
   (d) putting said lid on said mold having said frame exposed to a cavity of said mold;
   (e) charging said material feeding tube with a liquid foamable material for foamed plastic thereby to cause said foamable material to be poured into said cavity of said mold through said outlet portions of said frame and continuing said charging until said cavity is substantially completely filled with said foamable material to form said seat pad structure with said frame installed therein; and
   (f) removing said seat pad structure with said frame installed therein from said mold when said foamable material is hardened to a certain degree by detaching said frame from said clips.

2. A method as claimed in claim 1, wherein said forming step further comprises:
   forming said frame as a rectangularly extending member.

3. A method as claimed in claim 2, wherein said forming step further comprises:
   equipping said frame with a plurality of spring wires which extend between opposed side portions of said frame.

4. A method as claimed in claim 1, wherein said forming step further comprises:
   forming said frame as a rectangularly extending pipe member.

5. A method as claimed in claim 3, wherein said forming step further comprises:
   forming said frame as a rectangularly extending gutter member.

6. A method as claimed in claim 1, further comprising before step (d), putting a bag-shaped outer skin member into said mold.

7. A method as claimed in claim 1, wherein said preparing step further comprises:
   preparing said mold assembly as a non-rotational mold assembly.

8. A method as claimed in claim 7, wherein said forming step further comprises:
   forming said frame with outside dimension such that said frame extends substantially about an inner periphery of said mold assembly upon performance of said connecting and said putting steps.

9. A method as claimed in claim 8, wherein said forming step further comprises:
   forming said frame in a substantially rectangular, closed loop shape.

* * * * *